United States Patent
Lundquist et al.

(10) Patent No.: US 6,235,802 B1
(45) Date of Patent: May 22, 2001

(54) HIGH SURFACE AREA ADSORBENTS AND METHOD OF PREPARATION

(75) Inventors: Eric Gustave Lundquist, North Wales; Eric Jon Langenmayr, Bryn Mawr, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/636,070

(22) Filed: Aug. 10, 2000

Related U.S. Application Data

(62) Division of application No. 09/466,591, filed on Dec. 17, 1999.
(60) Provisional application No. 60/115,135, filed on Jan. 7, 1999.

(51) Int. Cl.$^7$ ................. C08F 8/18; C08F 8/36; C08F 8/38
(52) U.S. Cl. ................. 521/56; 521/33; 521/53; 521/56; 521/38; 521/146; 525/332.2; 525/344
(58) Field of Search ................. 521/53, 56, 33, 521/146; 525/332.2, 344

(56) References Cited

U.S. PATENT DOCUMENTS

| | | |
|---|---|---|
| 4,191,813 | 3/1980 | Reed et al. . |
| 4,263,407 | 4/1981 | Reed . |
| 4,543,365 | 9/1985 | Itagaki et al. . |
| 5,218,004 | 6/1993 | Meteyer . |
| 5,416,124 | 5/1995 | Stringfield . |

OTHER PUBLICATIONS

D.A. Davankov et al, Reactive Polymers, Elsevier Science Publishers, vol. 13, pp 27–42 (1990).
R.V. Law et al., Macromolecules, vol. 30, pp 2868–2875 (1997).
K. Lise Hubbard et al., React. Funct. Polym., vol. 36 (1), pp 17–30 (1998).
K. Ando et al, Ion Exchange for Industry (Proceedings of SCI Symposium IEX 88, Cambridge, UK), pp 232–238 (1988).
R.V. Law et al., Macromolecules, vol. 29, pp 6284–93 (1996).
Purolite Technical Bulletin: *Hypersol–Macronet Sorbent Resins*, pp 1–11 (1995).

*Primary Examiner*—Morton Foelak
(74) *Attorney, Agent, or Firm*—Thomas J. Howell

(57) ABSTRACT

A process for the preparation of high surface area, low-swelling macroporous polymeric adsorbents is disclosed. The use of organic sulfonic acids to provide postcrosslinking of macroporous copolymers eliminates the need for traditional organic swelling solvents and Lewis-acid catalysts used to provide conventional macronetted polymers. In particular, methanesulfonic acid provides macroporous polymeric adsorbents having high surface area and porosity, low levels of residual vinyl groups, and free of residual contaminants from conventional Lewis-acid/Friedel-Crafts reactions.

5 Claims, No Drawings

HIGH SURFACE AREA ADSORBENTS AND METHOD OF PREPARATION

This is a divisional of U.S. application Ser. No. 09/466,591, filed Dec. 17, 1999. The latter application is hereby incorporated by reference, which claim the benefit of Provisional No. 60/115,135 filed Jan. 7, 1999.

BACKGROUND

This invention relates to the postcrosslinking of pendant vinyl groups of crosslinked macroporous copolymers to produce macroporous adsorbents with improved properties. In particular the present invention relates to the use of organic sulfonic acids to provide the postcrosslinking of the macroporous copolymers.

High surface area adsorbents can be prepared by the "macronetting" of divinylbenzene copolymers or by the suspension polymerization of divinylbenzene (DVB) in the presence of a nonsolvent. These high surface area adsorbents are useful for the removal of organics from non-organic streams and have found use in a wide variety of applications including the removal of organic wastes from water and the recovery of pharmaceutical products from fermentation broths.

"Macronetted" or "hyper-crosslinked" adsorbents represent one class of adsorbents and can be produced by post-crosslinking involving the introduction of alkylene-bridge crosslinks into a swollen copolymer subsequent to initial polymerization, as described in U.S. Pat. Nos. 4,191,813, 4,263,407, 5,416,124 and D. A. Davankov et al., *Reactive Polymers,* Elsevier Science Publishers, Vol. 13, pages 27–42 (1990). The process disclosed in U.S. Pat. No. 4,191,813 involves first swelling a crosslinked vinylbenzylchloride-containing copolymer with an organic solvent followed by treatment with a Lewis-acid catalyst. The process described in U.S. Pat. No. 4,263,407 involves first swelling a crosslinked polystyrene copolymer with an organic solvent followed by treatment with a Lewis-acid catalyst in the presence of a polyfunctional Friedel-Crafts-reactive crosslinker. In both cases, upon heating the reactants, the substrate copolymer aromatic rings are further crosslinked (macronetted) with methylene or alkylene-type "bridges" derived from the chloromethyl group or reactive polyfunctional crosslinker. Another well-known approach to prepare macronetted adsorbents is first to chloromethylate a styrene/DVB copolymer with chloromethyl ether and then form methylene bridge crosslinks by adding a Friedel-Crafts/Lewis-acid catalyst in the presence of a swelling solvent (see U.S. Pat. No. 5,416,124 and Davankov et al.).

Macronetted adsorbents produced as described above swell in organic solvents and have been found to be less structurally stable than conventional "non-macronet" poly-divinylbenzene adsorbents, the latter, for example, being represented by highly crosslinked polymers prepared by suspension polymerization in the presence of a nonsolvent. Additionally, the production of these macronetted adsorbents requires the use of organic swelling solvents and Friedel-Crafts/Lewis-acid catalysts that are difficult to remove from the final product.

Macroporous copolymers produced from the suspension polymerization of DVB-containing monomer mixtures in the presence of a nonsolvent represent another class of adsorbents with a particular pore size distribution and surface area (conventional macroporous adsorbents). These conventional macroporous copolymers often contain a significant amount of pendant vinyl groups resulting from the incomplete crosslinking of DVB (R. V. Law et al., *Macromolecules,* Vol. 30, pages 2868–2875 (1997); K. Lise Hubbard et al., *React. Funct. Polym,* Vol. 36 (1), pages 17–30 (1998)). The incomplete crosslinking of these vinyl groups leads to a material with undesirable swelling properties in organic solvents, such as solvents used during adsorption/regeneration operations. Additionally the unreacted vinyl groups represent a potential site of undesirable chemical reactivity.

The enhancement of surface area and porosity of crosslinked macroporous copolymers by postcrosslinking the pendant vinyl groups has been disclosed in U.S. Pat. No. 5,218,004, where enhanced surface area was achieved by reacting the residual vinyl groups of a crosslinked copolymer (preconditioned with swelling solvent) with a Lewis-acid catalyst in the presence of water or other nonswelling liquid at elevated temperature. U.S. Pat. No. 4,543,365 discloses the use of a Lewis-acid catalyst to increase the surface area of a copolymer containing 8 to 80 percent crosslinker by postcrosslinking in the presence of an organic swelling agent.

The problem addressed by the present invention is to overcome the deficiencies of prior methods used to prepare high surface area adsorbents, such as requiring the use of swelling solvents and Lewis-acid/Friedel-Crafts catalysts, and to provide high surface area macroporous adsorbents having improved swelling properties, that is, a reduced tendency to swell in solvents during the adsorption/regeneration cycles of typical end use applications.

STATEMENT OF INVENTION

The present invention provides a macroporous polymeric adsorbent comprising monomer units of (a) from 50 to 100 percent by weight of one or more polyvinylaromatic monomer, and (b) from zero to 50 percent by weight of one or more monounsaturated vinylaromatic monomer; wherein the adsorbent contains less than 0.5 millimole vinyl groups per gram, has a surface area of greater than 700 square meters per gram, has a mesoporosity of greater than 0.7 cubic centimeter per gram, and has a swelling ratio in organic solvent of less than 10 percent by volume.

The present invention further provides a method for preparing a high surface area, low-swelling macroporous polymeric adsorbent comprising (a) contacting one or more macroporous copolymer comprising from 50 to 100 weight percent polyvinylaromatic monomer units, and having at least 1.0 millimole residual vinyl groups per gram copolymer, with at least 5 weight percent of one or more organic sulfonic acid, based on total weight of the macroporous copolymer, to form a copolymer-acid mixture; (b) maintaining temperature of the copolymer-acid mixture between 20 and 140° C. for at least 30 minutes; and (c) removing the organic sulfonic acid from the copolymer-acid mixture and isolating the macroporous adsorbent.

DETAILED DESCRIPTION

We have discovered a process for preparing a macroporous adsorbent that does not require the use of organic swelling solvents and provides a macroporous adsorbent having good physical stability, little or no swelling in organic solvents, and with few or no residual pendant vinyl groups.

As used herein, the term "superlink (SL) macroporous adsorbent" refers to macroporous polymers having the following properties:

(a) contain no or few residual vinyl groups, that is, less than 0.5, preferably from zero to 0.3, more preferably from zero to 0.2 and most preferably from zero to 0.1 millimole vinyl groups per gram polymer (mmol/g); and (b) exhibit little or no swelling in organic solvents (such as methanol, acetone or isopropanol), that is, less than 10%, preferably less than 5% and more preferably less than 3%, based on volume.

In a preferred embodiment, the SL macroporous adsorbents comprise at least 1.0, preferably from 1 to 7 and more preferably from 2 to 7 millimole of ($C_2$–$C_4$)alkylene bridging groups per gram of polymer (mmol/g); most preferably, the SL macroporous adsorbent will contain between 2 and 5 mmol/g of ($C_2$–$C_4$)alkylene bridging groups.

The SL macroporous adsorbents comprise at least 50% polyvinylaromatic monomer units, have surface areas of greater than 700, preferably greater than 800 and more preferably greater than 1000 square meters per gram ($m^2$/g); and mesoporosity values of greater than 0.3, preferably greater than 0.7 and more preferably greater than 0.9 cubic centimeter mesopores per gram polymer ($cm^3$/g).

Particularly preferred SL macroporous adsorbents of the present invention contain from zero to 0.1 mmol/g vinyl groups, have surface areas of greater than 800 $m^2$/g, mesoporosities of greater than 0.8 $cm^3$/g and swelling ratios in organic solvent of less than 5% by volume.

As used herein, the term "crosslinked macroporous copolymer" indicates a polymer or copolymer polymerized from a monomer or mixture of monomers containing at least 50 weight percent (%), based on the total monomer weight, of polyvinyl unsaturated monomer. The crosslinked macroporous copolymers useful in the preparation of SL macroporous adsorbents of the present invention are preferably polymerized from monomer mixtures containing at least 50% by weight polyvinylaromatic monomers.

Crosslinked macroporous copolymers useful as substrates for the postcrosslinking treatment of the present invention are preferably spherical copolymer beads having particle diameters from 10 microns ($\mu$m) to 2 millimeters (mm), such as are produced by suspension polymerization, and preferably possess a surface area greater than 300, preferably greater than 400 and more preferably greater than 500 $m^2$/g. Although any macroporous copolymer containing at least 1.0 mmol/g of residual vinyl groups and at least 50% polyvinylaromatic monomer units may be treated by the postcrosslinking process of the present invention, the preferred copolymer beads are those of the type described in U.S. Pat. No. 4,382,124, in which porosity is introduced into the copolymer beads by suspension-polymerization in the presence of a porogen (also known as "phase extender" or "precipitant"), that is, a solvent for the monomer but a non-solvent for the polymer.

A typical macroporous copolymer preparation, for example, may include preparation of a continuous aqueous phase solution containing suspension aids (such as dispersants, protective colloids and buffers) followed by mixing with a monomer mixture containing 50 to 100% polyvinylaromatic monomer, free-radical initiator and 2 to 5 parts porogen (such as toluene, xylenes, ($C_4$–$C_{10}$)-alkanols, ($C_6$–$C_{12}$)-saturated hydrocarbons or polyalkylene glycols) per one part monomer. The mixture of monomers and porogen is then polymerized at elevated temperature and the porogen is subsequently removed from the resulting polymer beads by various means; for example, toluene, xylene and ($C_4$–$C_{10}$)alcohols may be removed by distillation or solvent washing, and 20 polyalkylene glycols by water washing. The resulting macroporous copolymer is then isolated by conventional means, such as dewatering followed by drying.

The macroporous copolymers useful as substrates for the postcrosslinking treatment of the present invention do not derive their surface area from methylene-bridge crosslinks introduced into a swollen copolymer subsequent to initial polymerization, that is, they are not conventional "macronet" or "hypercrosslinked" copolymers, such as those previously described.

Suitable polyvinylaromatic monomers that may be used in the preparation of the macroporous copolymers useful in the process of the present invention include, for example, one or more monomer selected from the group consisting of divinylbenzene, trivinylbenzene, divinyltoluene, divinylnaphthalene and divinylxylene; it is understood that any of the various positional isomers of each of the aforementioned crosslinkers is suitable; preferably the polyvinylaromatic monomer is divinylbenzene. Preferably the macroporous copolymer comprises 50 to 95%, and more preferably 55 to 80%, polyvinylaromatic monomer units.

Optionally, aliphatic crosslinking monomers, such as ethyleneglycol diacrylate, ethyleneglycol dimethacrylate, trimethylolpropane triacrylate, trimethylolpropane trimethacrylate, diethyleneglycol divinyl ether and trivinylcyclohexane, may also be used in addition to the polyvinylaromatic crosslinker. When used, the aliphatic crosslinking monomers typically comprise as polymerized units, from zero to 20%, preferably from zero to 10%, and more preferably from zero to 5% of the macroporous polymer, based on the total monomer weight used to form the macroporous copolymer.

Suitable monounsaturated vinylaromatic monomers that may be used in the preparation of the macroporous copolymers useful in the process of the present invention include, for example, styrene, $\alpha$-methylstyrene, ($C_1$–$C_4$)alkyl-substituted styrenes and vinylnaphthalene; preferably one or more monounsaturated vinylaromatic monomer is selected from the group consisting of styrene and ($C_1$–$C_4$)alkyl-substituted styrenes. Included among the suitable ($C_1$–$C_4$) alkyl-substituted styrenes are, for example, ethylvinylbenzenes, vinyltoluenes, diethylstyrenes, ethylmethylstyrenes and dimethylstyrenes; it is understood that any of the various positional isomers of each of the aforementioned vinylaromatic monomers is suitable. Preferably the macroporous copolymer comprises zero to 45%, and more preferably 20 to 45%, monounsaturated vinylaromatic monomer units.

Optionally, non-aromatic vinyl monomers, such as aliphatic unsaturated monomers, for example, vinyl chloride, acrylonitrile, (meth)acrylic acids and alkyl esters of (meth) acrylic acids may also be used in addition to the vinylaromatic monomer. When used, the non-aromatic vinyl monomers typically comprise as polymerized units, from zero to 20%, preferably from zero to 10%, and more preferably from zero to 5% of the macroporous copolymer, based on the total monomer weight used to form the macroporous copolymer.

Suitable macroporous copolymers useful as substrates for the postcrosslinking process of the present invention are any macroporous copolymers containing some "free" vinyl groups. These vinyl groups are residual vinyl groups that were left unreacted (representing less than 100% efficiency of the crosslinker) during the polymerization process used to prepare the macroporous copolymer substrate. Suitable macroporous copolymer substrates comprise greater than 50 weight percent polyvinylaromatic monomer units and have at least 1.0, preferably from 1.5 to 7, and more preferably from 2 to 5 mmol/g residual vinyl groups. Macroporous copolymers based on 55–80% DVB (laboratory prepared and commercial materials) typically contain from 1.5 to 4.5 mmol/g of residual vinyl groups (see K. Lise Hubbard et al., *React. Funct. Polym.* Vol. 36 (1), pages 17–30 (1998)).

For example, one or more macroporous copolymers may be selected from the group consisting of divinylbenzene copolymer, styrene-divinylbenzene copolymer, divinylbenzene-ethylvinylbenzene copolymer and styrene-ethylvinylbenzene-divinylbenzene copolymer, for use in the postcrosslinking process of the present invention. Table 1 presents calculated ranges for residual vinyl group content of possible substrate macroporous copolymers depending on the copolymer composition and the degree of unreacted vinyl groups; typical macroporous copolymer substrates contain 50 to 95% DVB units with 25 to 75% of the second vinyl group of the divinylbenzene monomeric units remaining unreacted.

TABLE 1

Calculated Residual Vinyl Group Concentration in Various DVB-Copolymer Substrate Compositions (millimole/gram polymer) as Function of % Unreacted Vinyl Group

| Percent 2nd Vinyl Group Unreacted | 100% DVB (mmol/g) | 80% DVB (mmol/g) | 50% DVB (mmol/g) |
|---|---|---|---|
| 100 | 7.7 | 6.1 | 3.8 |
| 90 | 6.9 | 5.5 | 3.5 |
| 70 | 5.4 | 4.3 | 2.7 |
| 60 | 4.6 | 3.7 | 2.3 |
| 50 | 3.8 | 3.1 | 1.9 |
| 40 | 3.1 | 2.4 | 1.5 |
| 30 | 2.3 | 1.8 | 1.1 |
| 10 | 0.8 | 0.6 | 0.4 |
| 5 | 0.4 | 0.3 | 0.2 |
| 1 | 0.08 | 0.06 | 0.04 |
| 0.5 | 0.04 | 0.03 | 0.02 |

The high surface area, low-swelling macroporous adsorbents of the present invention may be prepared by postcrosslinking residual pendant vinyl groups of selected macroporous copolymer substrates with an organic sulfonic acid in the absence of a swelling solvent; optionally a swelling solvent may be used, but preferably no swelling solvent is used. The organic sulfonic acid catalyzes the reaction of the pendant vinyl groups with neighboring aromatic rings in the polymer matrix to give enhanced crosslinking and increased surface area as shown in Table 3. Substantially total elimination of the pendant vinyl groups is confirmed by $^{13}$C NMR. The increased crosslinking (introduced during the postcrosslinking treatment) also results in the elimination of undesirable swelling in organic solvents (such as methanol, acetone or isopropanol) that may occur during adsorption/regeneration cycles of typical end use applications.

Analyses by solid state $^{13}$C NMR (nuclear magnetic resonance) CP/MAS-TOSS (cross polarization magic angle spinning with total sideband suppression) were used to determine the amount of pendant vinyl groups remaining in macroporous copolymer substrates (see R. V. Law et al., *Macromolecules*, Vol. 30, pages 2868–2875 (1997)) used in the postcrosslinking process of the present invention. In addition to providing estimates of the amount of unreacted vinyl groups in the macroporous copolymer substrates and in the resulting SL macroporous adsorbent from the postcrosslinking reaction, the aforementioned NMR method also allowed characterization of the nature of the alkylene bridge formed during the postcrosslinking reaction.

Unlike the bridging that occurs in the preparation of conventional macronet polymers, there is little or no "methylene" type bridging when the postcrosslinking reaction of the present invention is used to prepare SL macroporous adsorbents. Conventional macronet polymers are typically based on methylene bridging groups as their source of crosslinking, as illustrated in structure (I):

~phenyl—CH$_2$—phenyl~ (I)

In addition to structure (I), the formation of a methyl-substituted ethylene-bridge is thought to account for at least some of the crosslinking associated with conventional macronet polymers using Lewis-acid catalysts in swelling solvents (see R. V. Law et al., *Macromolecules*, Vol. 29, pages 6287–6291 (1996) and K. Ando et al., *Ion Exchange for Industry* (Proceedings of SCI Symposium IEX 88, Cambridge, UK), page 237 (1988)). $^{13}$C NMR data (methyl group resonance at 15–25 ppm chemical shift) are consistent with the formation of the following structure (II):

(II)

In the postcrosslinking process of the present invention, if a methylene-type bridge were to form from the protonation of the residual vinyl group (by the organic sulfonic acid) and subsequent addition to an adjacent aromatic nucleus, a new "methyl" resonance, corresponding to structure (II) would be detectable by $^{13}$C NMR; however, this structure was not observed using NMR techniques (no increase in resonance at 15–25 ppm chemical shift), thus supporting the formation of a (C$_2$–C$_4$)alkylene type bridge structure between aromatic rings, such as those represented by (III), (IV) or (V):

~phenyl—CH$_2$CH$_2$—phenyl~ (III)

~phenyl—CH$_2$CH$_2$—phenyl~ (III)

(IV)

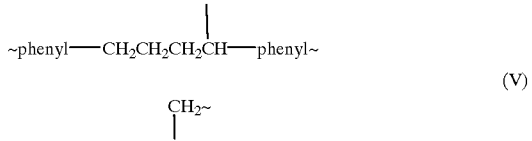

(V)

The amount of (C$_2$–C$_4$)alkylene bridge groups present in the SL macroporous adsorbent is assumed to be approximately equivalent to the amount of residual vinyl groups originally present in the macroporous copolymer substrate prior to the organic sulfonic catalyzed postcrosslinking reaction.

While not wishing to be bound by theory, we believe that structure (III) is the most likely bridging structure to form, based on direct bridging of the residual vinyl group between two aromatic nuclei. While bridging structures (IV) and (V) may be less preferred, they represent possible non-methylenic bridge formation depending upon the probability of the residual vinyl group reacting with other adjacent vinyl groups and the orientation of the respective reactive sites. We also believe, in the case of the present invention, that the efficacy of the organic sulfonic acids to promote the postcrosslinking of residual vinyl groups in the absence of organic swelling solvents is due to the unexpected properties of the organic sulfonic acids (i) to hydrophobically interact with the copolymer matrix to gain access to the residual vinyl group sites (ii) while providing a strong enough protonating agent to generate carbocation intermediates, ultimately resulting in non-methylenic bridge formation between aromatic nuclei of the same or neighboring backbone polymers. This bridging phenomenon effectively postcrosslinks the base polymer to such an extent that swelling (in conventional solvents) is substantially reduced and the overall porosity and surface area is increased by as much as 20 to 40% relative to the untreated copolymer.

Ideally greater than 90%, preferably greater than 95% and more preferably greater than 99%, of the residual vinyl groups of the macroporous copolymer substrate are converted to ($C_2$–$C_4$)alkylene bridge crosslinks by the postcrosslinking process of the present invention. By way of illustration, for macroporous copolymer substrates based on 50–80% DVB, residual vinyl group conversions of at least 90% correspond to less than 0.1–0.5 mmol/g vinyl groups remaining in the SL macroporous adsorbent; at least 95% conversion corresponds to less than 0.05–0.08 mmol/g; and at least 99% conversion corresponds to less than 0.02 mmol/g.

Organic sulfonic acids suitable for use in the postcrosslinking treatment include, for example, methanesulfonic acid (MSA), ethanesulfonic acid, benzenesulfonic acid, 4-hydroxybenzenesulfonic acid, p-toluenesulfonic acid (TSA), p-bromobenzenesulfonic acid, p-nitrobenzenesulfonic acid, trifluoromethanesulfonic acid, nonafluorobutanesulfonic acid and trifluoroethanesulfonic acid. Preferably, one or more organic sulfonic acid is used as a postcrosslinking catalyst and is selected from the group consisting of methanesulfonic acid, ethanesulfonic acid, p-toluenesulfonic acid and benzenesulfonic acid.

Typically, the organic sulfonic acid may be used as postcrosslinking catalyst and fluidizing agent simultaneously. In this case, the amount of organic sulfonic acid will represent at least 200%, preferably from 200 to 600%, more preferably from 250 to 500%, and most preferably from 300 to 500%, of the weight of the macroporous copolymer substrate. In these cases, the excess organic sulfonic acid is recovered at the end of the postcrosslinking reaction and may be reused in subsequent postcrosslinking treatments.

The postcrosslinking reaction is carried out by contacting the macroporous copolymer substrate with the desired amount of organic sulfonic acid and maintaining the temperature of the resulting copolymer-acid mixture between 20 and 140° C. for at least 30 minutes. Preferably the copolymer-acid mixture is maintained between 60 and 120° C. and more preferably between 100 and 120° C. Preferably the contact time is from 30 minutes to 72 hours, more preferably from 1 to 10 hours and most preferably from 1 to 5 hours.

Optionally, a fluidizing agent (other than the organic sulfonic acid) may be used in addition to the organic sulfonic acid or as a replacement for some portion of the organic sulfonic acid. In this case, at least 5%, preferably from 5 to 200%, and more preferably from 10 to 100% organic sulfonic acid, based on weight of macroporous copolymer, is used to catalyze the postcrosslinking reaction. Suitable non-swelling fluidizing agents include, for example, ($C_6$–$C_{12}$)-saturated hydrocarbons (such as hexane and isooctane), aprotic polar solvents (such as sulfolane), fluorocarbons (such as perfluorohexane) and chlorofluorocarbons. Another preferred non-swelling fluidizing agent is aqueous sulfuric acid. When used as a fluidizing agent, the sulfuric acid is at least 50% sulfuric acid and preferably less than 85% sulfuric acid; more preferably, the sulfuric acid concentration is from 60 to 80% (the remaining 20 to 40% being water). When used, the amount of fluidizing agent is typically from 100 to 600%, preferably 200 to 500%, and more preferably from 300 to 500%, of the weight of the macroporous copolymer substrate. In these cases, the excess fluidizing agent (together with residual organic sulfonic acid) is recovered at the end of the postcrosslinking reaction and may be reused in subsequent postcrosslinking treatments.

After completion of the temperature-hold period, the copolymer-acid mixture is typically cooled (if required) and the excess organic sulfonic acid (or mixture of fluidizing agent-organic sulfonic acid) is decanted off or removed by siphoning. The recovered organic sulfonic acid may be reused in subsequent postcrosslinking reactions. The postcrosslinked macroporous copolymer is then washed free of residual sulfonic acid with water and dried to provide the SL macroporous adsorbent.

Optionally, an organic swelling solvent may be used to swell the macroporous copolymer substrate, followed by treatment with organic sulfonic acid to provide the SL macroporous adsorbent. In this case, amounts of the organic sulfonic are similar to those used when a fluidizing agent is used (see above), that is, at least 5%, preferably from 5 to 200%, and more preferably from 10 to 100% organic sulfonic acid, based on weight of macroporous copolymer. In addition, the organic swelling solvent may be used in conjunction with a fluidizing agent. When used, the amount of organic swelling solvent is typically at least 20%, and preferably from 100 to 200%, based on weight of macroporous copolymer. Suitable swelling solvents include, for example, one or more of solvents selected from the group consisting of benzene, nitrobenzene, nitromethane, toluene, xylene, methylene chloride, ethylene dichloride, propylene dichloride, chlorobenzene and dichlorobenzene. Preferably, the postcrosslinking reaction is conducted in the absence of any organic swelling solvent.

The SL macroporous adsorbents provided by the process of the present invention contain few or no residual vinyl groups. The nature of the postcrosslinking is believed to provide ethylenic bridging groups via the consumption of any residual vinyl groups present in the macroporous copolymer substrate. The postcrosslinking (or "superlink") step of the present invention results in a final polymer matrix containing a high level of total porosity, and in a preferred embodiment, a high level of mesoporosity. Total porosity of macroporous adsorbents is comprised of micro-, meso- and macro-porosity. Representative of the SL macroporous adsorbents prepared by the process of the present invention are polymers having microporosity from zero to 0.7 cm$^3$/g, preferably from zero to 0.5 cm$^3$/g and most preferably from zero to 0.2 cm$^3$/g; mesoporosity from 0.3 to 2 cm$^3$/g, preferably from 0.7 to 1.8 cm$^3$/g and more preferably from 0.9 to 1.5 cm$^3$/g; and macroporosity from zero to 1 cm$^3$/g, preferably from 0.01 to 0.5 cm$^3$/g and more preferably from 0.02 to 0.2 cm$^3$/g. According to accepted IUPAC nomenclature, micropores correspond to pores sized smaller than 20 Ångstrom units, mesopores correspond to those between 20 and 500 Ångstrom units, and macropores correspond to those larger than 500 Ångstrom units.

The SL macroporous adsorbents of the present invention are characterized by exceptional resistance to swelling and excellent physical stability in the presence of organic solvents. That is, the SL macroporous adsorbents exhibit swelling in organic solvents corresponding to less than 10%, preferably less than 5% and more preferably less than 3%, based on volume. For example, methanol, acetone and isopropanol are organic solvents used to characterize the swelling properties of adsorbents; these solvents are representative of those typically used to wash or regenerate the adsorbents during end use applications. Table 2 presents a summary of swelling properties of conventional macronet, conventional non-postcrosslinked macroporous copolymers and SL macroporous adsorbents of the present invention (volume/volume swelling from dry to swollen over 24 hours, unless indicated otherwise). The SL macroporous adsorbents of the present invention combine physically stable, low swelling characteristics (organic solvents) with low levels of residual vinyl group content, unlike the prior art adsorbents (macronet or conventional non-postcrosslinked macroporous copolymer).

TABLE 2

Swelling Properties of Polymers in Organic Solvents

| Polymer Type | Methanol | Acetone | Isopropanol |
|---|---|---|---|
| Conventional Macronet Polymers | | | |
| Dow XUS-1[a] | 33%* | 36* | 39* |
| Dow XUS-2[b] | 33% | 44% | 32% |
| Purolite MN-200[c] | 63%* | 60%* | 75%* |
| Mitsubishi SP-825[d] | 25% | 21% | 30% |
| Conventional Non-Postcrosslinked Macroporous Copolymer | | | |
| 1 | 80% | — | — |
| 2 | 70% | — | — |
| 3 | 20% | — | — |
| 4 | 23%** | 27%** | 26%** |
| 4 | 54% | 63% | 75% |
| 5 | 22% | 33% | 33% |
| 6 | 27% | 29% | 36% |
| SL Macroporous Adsorbents (present invention) | | | |
| 1SL | 0% | 3% | 0% |
| 4SL-A | 0%** | 3%** | 0%** |
| 4SL-B | 0%** | 7–8%** | 0%** |
| 4SL-C | 0%** | 4%** | 0%** |

*= breakage of beads during swelling
**= swelling from water wet polymer beads
[a]= polymeric adsorbent: "methylene bridged copolymer of styrene and divinylbenzene" (CAS# 069011-14-9) available as Dow XUS-43502.01 from Dow Chemical Company, Midland, MI, USA.
[b]= polymeric adsorbent: "methylene bridged copolymer of styrene and divinylbenzene" (CAS# 069011-14-9) available as Dow XUS-43565.01 from Dow Chemical Company, Midland, MI, USA.
[c]= Hypersol-Macronet Sorbent resin available from Purolite Company, Bala Cynwyd, PA, USA.
[d]= Sepabeads macronet adsorbent available from Mitsubishi Chemical Corporation, Tokyo, Japan.

The SL macroporous adsorbents of the present invention may be used in conventional adsorption applications, such as removal of organics from non-organic streams, removal of organic wastes from water and the recovery of pharmaceutical products from fermentation broths. In addition, the SL macroporous adsorbent may be further functionalized by well-known conventional means to provide ion-exchange group or hydrophilic group moieties, for example, weak (carboxylic) or strong (sulfonic) acid sites, weak (alkylamino) or strong (quaternary ammonium) base sites and hydroxyl groups.

Table 3 summarizes porosity and surface area properties of the macroporous copolymers, macronet polymers and SL macroporous adsorbents evaluated.

TABLE 3

Porosity and Surface Area Properties

| Polymer Identification | Total Porosity ($cm^3/g$) | Micro- porosity ($cm^3/g$) | Meso- porosity ($cm^3/g$) | Macro- porosity ($cm^3/g$) | Surface Area ($m^2/g$) |
|---|---|---|---|---|---|
| Dow XUS-1[a] | 0.88 | 0.39 | 0.21 | 0.28 | 1009 |
| Dow XUS-2[b] | — | — | — | — | — |
| Purolite MN-200[c] | 0.61 | 0.44 | 0.09 | 0.07 | 1018 |
| Mitsubishi SP-825[d] | 1.19 | 0.43 | 0.70 | 0.06 | 913 |
| 1 | 1.04 | 0.40 | 0.60 | 0.04 | 846 |
| 2 | 1.05 | 0.41 | 0.62 | 0.02 | 851 |
| 3 | 1.60 | 0.47 | 0.95 | 0.18 | 905 |
| 4 | 1.14 | 0.41 | 0.71 | 0.02 | 859 |
| 5 | 1.21 | 0.43 | 0.76 | 0.02 | 904 |
| 6 | 1.86 | 0.46 | 0.87 | 0.52 | 966 |
| 1SL | 1.42 | 0.49 | 0.76 | 0.17 | 1024 |
| 4SL-A | 1.43 | 0.49 | 0.90 | 0.04 | 1020 |
| 4SL-B | 1.48 | 0.48 | 0.95 | 0.05 | 1008 |
| 4SL-C | 1.45 | 0.49 | 0.92 | 0.04 | 1033 |

Porosimetry was determined using a Micromeretics ASAP-2400 nitrogen Porosimeter
[a, b, c, d]= see Table 2.

Abbreviations used throughout the Specification, Examples and Tables are listed below with the corresponding descriptions. Hypersol-Macronet is a trademark of Purolite Company, Bala Cynwyd, Pa., USA; Sepabeads is a trademark of Mitsubishi Chemical Corporation, Tokyo, Japan.

| | |
|---|---|
| MSA | = Methanesulfonic Acid |
| TSA | = p-Toluenesulfonic Acid |
| DVB | = Divinylbenzene |
| EVB | = Ethylvinylbenzene |
| SL | = Superlink (postcrosslinking) |
| CP | = Cross Polarization |
| MAS | = Magic Angle Spinning |
| TOSS | = Total Sideband Suppression |
| 1–6 | = Macroporous copolymer substrates: all 80% DVB/20% EVB with toluene porogen, each prepared separately. |
| 1SL, 4SL | = Corresponding superlinked macroporous adsorbent |

Some embodiments of the invention are described in detail in the following Examples. All ratios, parts and percentages are expressed by weight unless otherwise specified, and all reagents used are of good commercial quality unless otherwise specified.

EXAMPLE 1

Macroporous copolymer beads (prepared according to the general procedure described in U.S. Pat. No. 4,382,124 using toluene as a porogen and containing 80% DVB/20% EVB monomer units, having approximately 3.5–4.5 mmol/g residual vinyl groups, total porosity of 1.04 $cm^3/g$, mesoporosity of 0.60 $cm^3/g$ and surface area of 846 $m^2/g$) were postcrosslinked by treating 80 g of macroporous copolymer beads with a 200 g methanesulfonic acid (MSA), 99% purity, to form a copolymer-acid slurry. This mixture was heated to 120° C. with agitation and held at that temperature for 6 hours. The reaction mixture was then cooled to 60° C. and excess MSA was siphoned away from the copolymer-acid mixture; in this manner, 168 g (84%) of the original acid charge was recovered as clear and colorless MSA. The drained copolymer beads were then washed with water by adding 500 g water over 30 minutes with stirring. The wash water was siphoned off and the beads were similarly treated a second time with 500 g water. The postcrosslinked macroporous copolymer was recovered as amber, translucent beads. Upon examination of the adsorbent by $^{13}$C NMR, no residual vinyl groups were detectable (lack of NMR resonance at chemical shifts of 137 and 112 ppm, methine and methylene of free vinyl group, respectively); in addition, no methyl-substituted methylene-bridges were detected (lack of increase in NMR resonance at chemical shift of 15–25 ppm).

EXAMPLES 2–6

In a fashion similar to that described in Example 1, various macroporous copolymers were postcrosslinked. The compositions of the various substrate macroporous copolymers were all 80% DVB/20% EVB and represented different samples (prepared separately); properties of the corresponding SL macroporous adsorbents (based on macroporous copolymer substrates 1 and 4) are presented in Tables 2 and 3.

Example 2: macroporous copolymer substrate=80% DVB/20% EVB with toluene porogen, approximately 3.5–4.5 mmol/g residual vinyl groups, total porosity of 1.05 cm$^3$/g, mesoporosity of 0.62 cm$^3$/g and surface area of 851 m$^2$/g.

Example 3: macroporous copolymer substrate=80% DVB/20% EVB with toluene porogen, approximately 2.5–3 mmol/g residual vinyl groups, total porosity of 1.60 cm$^3$/g, mesoporosity of 0.95 cm$^3$/g and surface area of 905 m$^2$/g Example 4: macroporous copolymer substrate=80% DVB/20% EVB with toluene porogen, approximately 3.5–4.5 mmol/g residual vinyl groups, total porosity of 1.14 cm$^3$/g, mesoporosity of 0.71 cm$^3$/g and surface area of 859 m$^2$/g. The corresponding SL macroporous adsorbent is 4SL. Three different samples of this macroporous copolymer substrate were postcrosslinked under conditions similar to those described in Example 1. The ratio of MSA/macroporous copolymer substrate was 200 g/50 g, 250 g/50 g and 250 g/50 g, respectively, for preparation of the resulting SL macroporous adsorbents, referred to as 4SL-A, 4SL-B and 4SL-C, respectively. Elemental analysis of 4SL-A showed less than 0.05% sulfur, indicating no detectable incorporation of the organic sulfonic acid catalyst into the treated polymer.

Example 5: macroporous copolymer substrate=80% DVB/20% EVB with toluene porogen, total porosity of 1.21 cm$^3$/g, mesoporosity of 0.76 cm$^3$/g and surface area of 904 m$^2$/g.

Example 6: macroporous copolymer substrate=80% DVB/20% EVB with toluene porogen, total porosity of 1.86 cm$^3$/g, mesoporosity of 0.87 cm$^3$/g and surface area of 966 m$^2$/g.

EXAMPLES 7–9

Macroporous copolymer beads were also postcrosslinked by first swelling the copolymer in an organic swelling solvent and treating the swollen mixture with organic sulfonic acid. The copolymer substrate descriptions and postcrosslinking conditions are summarized below:

Example 7: Five grams (g) macroporous copolymer beads (80% DVB/20% EVB with toluene porogen, total porosity of 1.06 cm$^3$/g and surface area of 850 m$^2$/g) were swollen in 94 g of ethylene dichloride for 6 hours, followed by addition of 0.5 g (10% on copolymer) of TSA and heating at 82° C. for 16 hours. The swollen beads were drained free of excess ethylene dichloride, washed 2 times with acetone and 5 times with ethanol, followed by drying, to provide 5.0 grams of SL macroporous adsorbent having the following properties: total porosity of 1.25 cm$^3$/g and surface area of 1040 m$^2$/g.

Example 8: Two grams (g) macroporous copolymer beads (80% DVB/20% EVB with toluene porogen, total porosity of 1.04 cm$^3$/g and surface area of 807 m$^2$/g) were swollen in 4 to 11 g of toluene for approximately 2 hours, followed by addition of 0.2 g (10% on copolymer) of TSA and held at 20–25° C. for 50–55 hours. The swollen beads were drained free of excess toluene, washed 2 times with acetone and 5 times with ethanol, followed by drying, to provide 2.0 grams of SL macroporous adsorbent having the following properties: total porosity of 1.10 cm$^3$/g and surface area of 949 m$^2$/g.

Example 9: Two grams (g) macroporous copolymer beads (80% DVB/20% EVB with toluene porogen, total porosity of 1.80 cm$^3$/g and surface area of 914 m$^2$/g) were swollen in 4 to 11 g of chlorobenzene for approximately 2 hours, followed by addition of 0.2 g (10% on copolymer) of TSA and held at 20–25° C. for 50–55 hours. The swollen beads were drained free of excess toluene, washed 2 times with acetone and 5 times with ethanol, followed by drying, to provide 2.0 grams of SL macroporous adsorbent having the following properties: total porosity of 2.18 cm$^3$/g and surface area of 1071 m$^2$/g.

The macroporous copolymer substrates used in Examples 7–9 swell approximately 30% in ethylene dichloride, whereas the corresponding SL macroporous adsorbents derived from the substrates swell only 5–6% in ethylene dichloride. The surface areas and total porosities of the SL macroporous adsorbents of Examples 7–9 represented increases of 17–22% and 6–21%, respectively, over surface areas and porosities of the corresponding macroporous copolymer substrates.

We claim:

1. A macroporous polymeric adsorbent comprising monomer units of:
   (a) from 50 to 100 percent by weight of one or more polyvinylaromatic monomer, and
   (b) from zero to 50 percent by weight of one or more monounsaturated vinylaromatic monomer;
   wherein the adsorbent contains less than 0.5 millimole vinyl groups per gram, has a surface area of greater than 700 square meters per gram, has a mesoporosity of greater than 0.7 cubic centimeter per gram, and has a swelling ratio in organic solvent of less than 10 percent by volume.

2. The adsorbent of claim 1 wherein the one or more polyvinylaromatic monomer is selected from the group consisting of divinylbenzene, trivinylbenzene, divinyltoluene, divinylnaphthalene and divinylxylene.

3. The adsorbent of claim 1 wherein the one or more monounsaturated vinylaromatic monomer is selected from the group consisting of styrene and ($C_1$–$C_4$)alkyl-substituted styrenes.

4. The adsorbent of claim 1 wherein the adsorbent contains from zero to 0.1 millimole vinyl groups per gram, has a surface area of greater than 800 square meters per gram, has a mesoporosity of greater than 0.8 cubic centimeter mesopores per gram, and has a swelling ratio in organic solvent of less than 5 percent by volume.

5. The adsorbent of claim 1 further comprising at least 1.0 millimole per gram of ($C_2$–$C_4$)alkylene bridging groups.

* * * * *